Aug. 19, 1941.　　　　P. R. LEE　　　　2,253,382

THERMOSTATIC MEMBER

Filed Jan. 5, 1940

WITNESSES:
E. A. McCloskey.
Nw. C. Groome

INVENTOR
Paul R. Lee.
BY
Ezra W. Savage
ATTORNEY

Patented Aug. 19, 1941

2,253,382

UNITED STATES PATENT OFFICE 2,253,382

THERMOSTATIC MEMBER

Paul R. Lee, Mansfield, Ohio, assignor to Westinghouse Electric & Manufacturing Company, East Pittsburgh, Pa., a corporation of Pennsylvania Application January 5, 1940, Serial No. 312,536

4 Claims. (Cl. 297—15)

This invention relates to temperature responsive devices, and particularly to thermostatic members of the bimetallic type.

Thermostats have been produced heretofore of different metals and having different characteristics. A common characteristic of certain of the known thermostats is that, below a certain temperature, the ratio of expansion characteristics of the elements of the thermostat is greater than the ratio of expansion of the elements when subjected to higher temperature. Other thermostats have fairly constant deflection characteristics but the deflection rate is so active as to render the thermostat undesirable as creep thermostats in many applications.

Attempts have been made to overcome the disadvantages of the known thermostats, which have fairly constant deflection characteristics, by employing thicker elements in an attempt to reduce the excessive deflection constants, such thicker elements being satisfactory for that purpose in narrow temperature ranges. Such modifications of the thermostats, however, introduce other disadvantages, such as increased bulk, together with increased cost, not justified by the results obtained.

An object of this invention is to provide a thermostatic member of layers of metal having different coefficients of expansion which cooperate, when subjected to heat, to provide a uniform deflection over a given temperature range.

Another object of this invention is to provide a thermostatic member of different metals, each having comparatively high coefficients of expansion, and which cooperate, when subjected to increasing temperatures, to have slight bending activity, the amount of bending being in a substantially straight line relation with changes in temperature.

Figure 1:
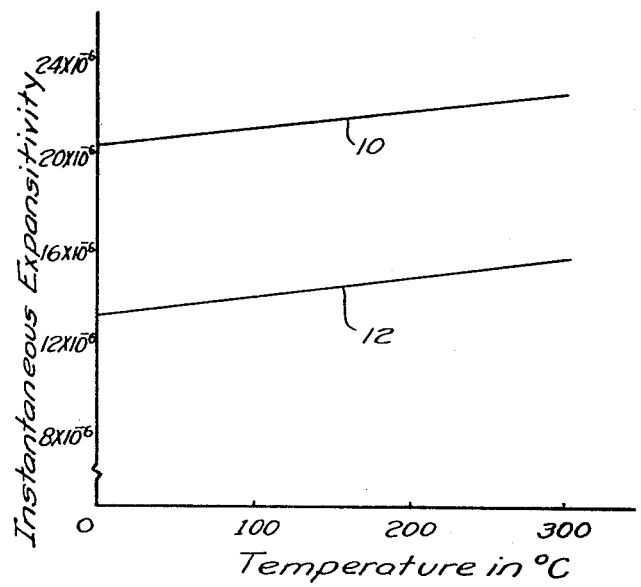
Figure 2:
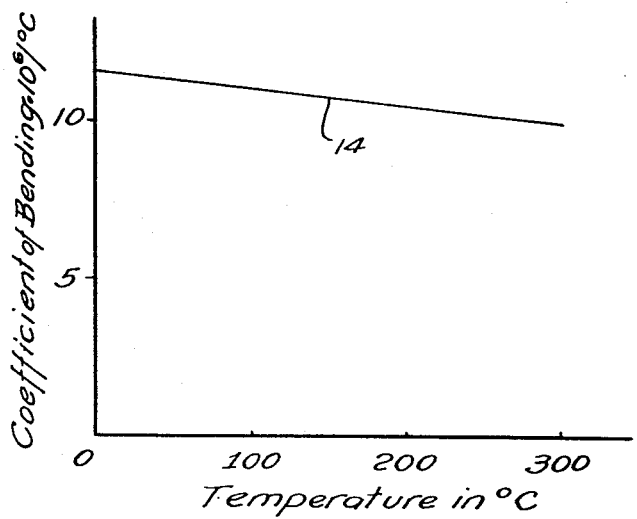

Other objects of this invention will become apparent from the following description when taken in conjunction with the accompanying drawing, Figure 1 of which is a graph, the curves of which illustrate the instantaneous expansivity of representative elements of a bimetallic thermostat at different temperatures; and Fig. 2 is a graph, the curve of which illustrates the coefficient of bending of a bimetal formed of the elements represented in Fig. 1 as against temperature in degrees centigrade.

In practicing this invention, it is found that a thermostatic member comprising two metal elements, one of which is a copper base alloy, and the other of which is a copper nickel alloy, generally known as Monel metal, will function throughout a range of temperatures to give a substantially straight line coefficient of bending and will be so comparatively inactive as to operate satisfactorily as a creep-type thermostat. A creep-type thermostat is one which, under the influence of a change in temperature, is free to bend continuously and slowly in proportion to the change of temperature encountered until it makes contact or meets with an obstruction which prevents further movement.

In practicing this invention, a copper base alloy having a composition of from 95% to 98% of copper, 1% to 2% of iron, 1% to 2% of silicon, and 0.5% to 1% of nickel is employed as the layer having the higher coefficient of expansion, while an alloy known generally as Monel metal, and comprising substantially from 30% to 35% of copper and 65% to 70% of nickel, is employed as the layer of metal having the lower coefficient of expansion. Although Monel metal is generally represented as comprising two-thirds copper and one-third nickel, the Monel metal which is satisfactory for use as the layer having a low coefficient of expansion in the thermostatic member of this invention comprises from 30% to 35% of copper, from 65% to 70% of nickel, up to 2.5% of iron, up to 0.5% of silicon, up to 1.5% of manganese, and up to 0.3% of carbon. Each of the alloy components referred to has a comparatively high coefficient of expansion as is illustrated in Fig. 1 of the drawing, curve 10 representing the instantaneous expansivity of a particular alloy having a composition of 96.84% of copper, 1.38% of iron, 1.23% of silicon, and .69% of nickel, and curve 12 representing the instantaneous expansivity for a Monel metal comprising 67.35% of nickel, 30% of copper, 1.4% of iron, 0.1% of silicon, 1.0% of manganese, and 0.15% of carbon.

As represented in Fig. 1 of the drawing, the metals comprising the high and low expansion layers of the thermostatic member of this invention have substantially straight line instantaneous expansivity values, the coefficient of expansion of each being comparatively high, the difference between the expansivity values of each of the metallic layers remaining substantially constant throughout the temperature range.

With the high and low expansion layers of the thermostatic member formed of the metals selected from the compositions given hereinbefore, they may be combined in any suitable manner for cooperating with each other to give the desired deflection when subjected to heat. For example, the layers of metals may be welded over the entire abutting surfaces, or they may be secured at their respective ends only either by welding or riveting, or in any other suitable manner, for securing the layers together whereby they will effectively cooperate with each other to give the desired deflection.

Referring to Fig. 2 of the drawing, curve 14 is representative of the coefficient of bending obtained for the thermostatic member formed of the metals represented by curves 10 and 12 of Fig. 1 when subjected to different temperatures. As illustrated, curve 14 is a substantially straight line, and, as is clearly apparent through the use of two metals having comparatively high coefficients of expansion, a bimetal thermostatic member is secured having comparatively little activity over a given temperature range, but such activity as is obtained is in a substantial straight line relation, so that the resulting thermostatic member is satisfactory for use as a creep-type thermostat.

Since the resulting thermostat formed of the metals within the ranges given hereinbefore is rather inactive compared to thermostats formed of layers of metal, one of which has a high coefficient of expansion and the other of which has a very low coefficient of expansion, it is found that only normal thicknesses of layers of the metal are necessary for obtaining the desired slight activity of the thermostatic member. Thus a creep-type thermostat is produced without the disadvantage of increasing the bulk of the thermostatic member. Further, since the components of the thermostatic member of this invention are of standard materials, a thermostat can be produced at a relatively low cost.

Although this invention has been described with reference to a particular embodiment thereof, it is apparent that various modifications and changes may be made without departing from the spirit of the invention, and it should, therefore, not be limited except insofar as is necessitated by the scope of the appended claims.

I claim as my invention:

1. A thermostatic member comprising a plurality of layers of metal having different coefficients of expansion, the higher coefficient of expansion layer having a composition of 95% to 98% of copper, 1% to 2% of iron, 1% to 2% of silicon and .5% to 1% of nickel, and the lower coefficient of expansion layer being an alloy comprising substantially 30% to 35% of copper and 65% to 70% of nickel.

2. A thermostatic member comprising a plurality of layers of metal having different coefficients of expansion, the higher coefficient of expansion layer having a composition of 95% to 98% of copper, 1% to 2% of iron, 1% to 2% of silicon and .5% to 1% of nickel, and the lower coefficient of expansion layer being an alloy of 67.35% of nickel, 30% of copper, 1.4% of iron, 0.1% of silicon, 1% of manganese and 0.15% of carbon.

3. A thermostatic member comprising a plurality of layers of metal having different coefficients of expansion, the higher coefficient of expansion layer having a composition of 96.84% of copper, 1.38% of iron, 1.23% of silicon and 0.69% of nickel, and the lower coefficient of expansion layer being an alloy comprising substantially 30% to 35% of copper and 65% to 70% of nickel.

4. A thermostatic member comprising a plurality of layers of metal having different coefficients of expansion, the higher coefficient of expansion layer having a composition at 96.84% of copper, 1.38% of iron, 1.23% of silicon and 0.69% of nickel, and the lower coefficient of expansion layer being an alloy of 67.35% of nickel, 30% of copper, 1.4% of iron, 0.1% of silicon, 1% of manganese and 0.15% of carbon.

PAUL R. LEE.